Aug. 3, 1965    S. O. ROLFSNESS ETAL    3,197,911
SPINNING FISH BAIT LURE AND LURE HARNESS
Filed April 27, 1964
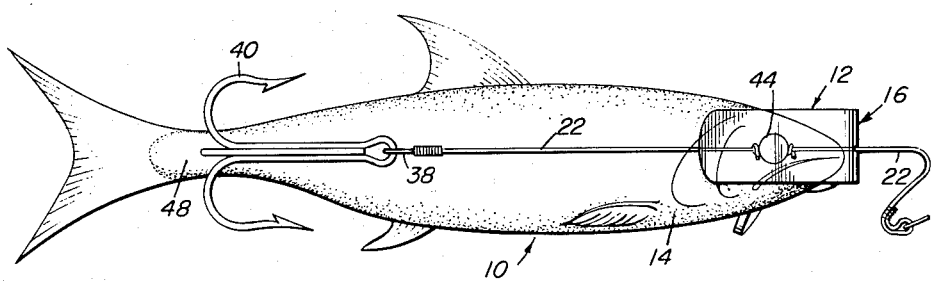
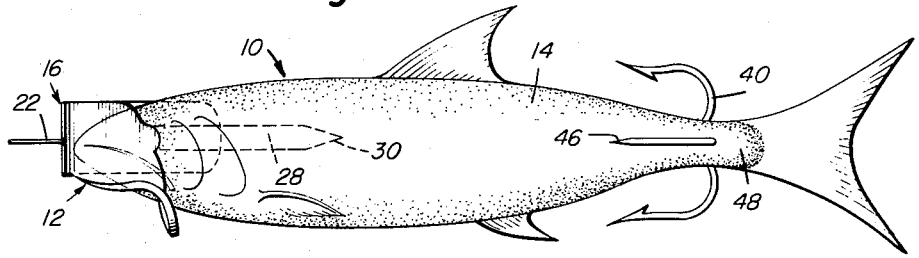
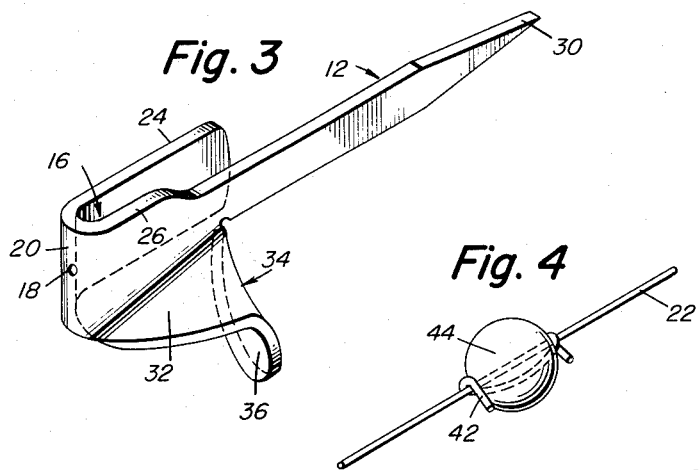
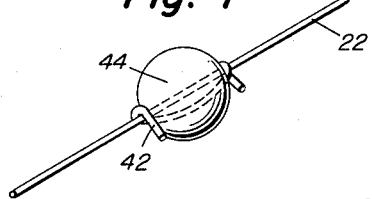
INVENTORS
Selmer O. Rolfsness
Gary A. Rolfsness
BY Gustave Miller
ATTORNEY

3,197,911
SPINNING FISH BAIT LURE AND LURE HARNESS

Selmer O. Rolfsness, 6122 Avalon Drive, Eureka, Calif., and Gary A. Rolfsness, P.O. Box 56, Cutten, Calif.
Filed Apr. 27, 1964, Ser. No. 362,821
5 Claims. (Cl. 43—44.2)

This invention relates to a spinning fish bait lure and lure harness, and has for an object to provide an improved lure and lure harness for providing a spinning fish bait lure.

It is an object of this invention to provide a fish bait lure harness which may be used with frozen or dead fish bait, and also with live fish bait, and which will hold the fish bait therein and cause it to spin in a tight spin so as to resemble the tight death spin of a crippled, dying fish, and not the unnatural, loose or arcing spin of other lures nor the normal swimming of a sound, live fish. Salmon and others of the larger game fish feed largely on bait fish such as herring, anchovy and sardine. These bait fish travel in schools of one size or another. The feeding salmon will attack such a school, threshing or slapping it tail as it darts through the school. Numbers of the small bait fish are crippled or stunned, and these are the prey of the salmon, and one by one, they are devoured. Characteristically, these crippled bait fish go into what may be termed a tight, death spin, being unable to maneuver normally. In this spinning state, the cripple can easily be spotted because of the flashes of brilliance caused by light reflecting from its scales.

It is a further object of this invention to provide a spinner blade as part of the harness lure of this invention, which spinner blade both causes the fish bait to spin with the same tight spin of a crippled bait fish, and which blade, in spinning, will cause the fish bait to reflect flashes of brilliance in the same manner as a tightly spinning dying or crippled bait fish.

A further object of this invention is to provide a spinner fish bait lure harness which may be used preferably with herring, anchovies or sardines, which may be dead or frozen, as well as with live bait fish or other bait fish of appropriate sizes.

Still a further object of this invention is to provide a spinning fish bait lure harness which can be adapted to any size bait, and which, when once secured, will not slip or tear out, and is simple, fast and safe to use, and which keeps both the mouth and the gills of the fish bait firmly closed.

A further object of this invention is to provide a fish spinning fish bait lure harness which is essentially a single integral piece and is used in cooperation with a fish hooker leader and fish hook, and with a wedging bead slidably secured on the leader.

Still a further object of this invention is to provide a spinner fish bait lure harness wherein the single integral piece may be made of a completely transparent plastic so as to be completely invisible, and which may be also made of stainless steel or other non-corroding metal, or other plastics, and be substantially invisible inasmuch as it provides such a small visible area in comparison with the fish bait.

With the above and related objects in view, this invention consists in the details of construction and combination of parts, as will be more fully understood from the following description, when read in conjunction with the accompanying drawings in which:

FIG. 1 is a an elevational view of the spinning fish bait lure harness of this invention in operative position.

FIG. 2 is a view of the opposite side of FIG. 1.

FIG. 3 is a perspective view of the one piece muzzle, fish penetrating shaft and spinner blade of the harness.

FIG. 4 is a perspective view of the wedging bead slidably secured on the leader.

There is shown at 10 the spinner fish bait lure as provided by using the fish bait lure harness of this invention as shown separately at 12 in FIG. 3. This harness 12 is preferably made as an integral, one piece device, and preferably of high impact transparent plastic material so as to be completely invisible, but which may also be made of other translucent or opaque plastic materials or of non-corrodable metals, such as stainless steel, copper, aluminum or other suitable materials capable of being cast, molded or whittled to the proper shape.

In addition to the harness 12, the fish bait 10 includes a suitable bait fish 14, such as herring, anchovy or sardine, preferably dead or frozen, but which may be alive when first included, but which, if alive, will obviously not remain alive very long, for it is the purpose of this invention to cause the bait fish 14 to simulate a crippled, dying fish in its tight death spin, and not a normal, live fish.

The harness 12 is preferably a one piece or integral unit, and includes a U-shape muzzle 16 having an aperture 18 through the center of its bight 20, a fish line leader 22 extending therethrough in assembled position. The muzzle 16 includes the U-bight 20 and two U-legs 24 and 26 spaced somewhat apart. Integrally extending from one of the legs, as the U-leg 26, is a narrow shaft 28 terminating in a chisel end 30. Integrally extending smoothly and outwardly from the bottom of one U-leg, preferably the same U-leg 26 from which the shaft 28 extends, is one wing 32 of a screw or propeller blade 34, and a second wing 36 extends smoothly downwardly from that edge of the first wing 32 that is rearmost from the U-bight 20, the angle of the general plane of the first wing 32 to that of the muzzle U-legs being slightly greater than a right angle, and similarly, the angle of the general plane of the second or downwardly extending wing 36 to the first wing 32 also being slightly greater than that of a right angle. The construction of the propeller blade 34, as thus described, is substantially that as shown in the drawing, the blade 34 thus being pitched to bore through the water in a tight spin as it is drawn through the water.

At one end of the leader 22, there is provided a fixed loop 38 to which is secured a preferably triple hook 40. On the leader 22 there is slidably secured, as by an anchor spring 42, a wedging bead or stopper 44. The other end of the leader 22 is secured in any conventional manner to any type of fishing line. The wedging bead 44 is located between the harness 12 and the hook 40 on the end of the leader 22.

In operation, the fisherman holds the bait fish 14 in the left hand and inserts one prong 46 of the hook 40 through the tail 48, then slidably adjusts the wedging bead or stopper 44 along the leader 22 until it is over one eye socket of the bait fish 14. Then he inserts the chisel point 30 of the shaft 28 through the other eye socket of the bait fish 14 and into the body of the bait fish 14 as far as it will go while simultaneously moving the muzzle 16 to cover the mouth and at least partly cover the gills of the bait fish 14, the U-leg 24 meantime moving over the bead 44 on the eye socket and wedging the bead 44 into the eye socket. The leader 22 meantime extends along one side of the bait fish 14, as seen in FIG. 1, and extends through the aperture 18 in the muzzle U-bight 20 and to the fish line to which it is connected. Due to this sliding bead or stopper 44, it can be used on any size bait fish 14, and installing the harness on the bait fish 14 is fairly safe, since only the hook bears any sharp edge, the shaft point 30 being inserted entirely within the body of the bait fish 14.

In use, the fisherman pulling his fishing line and leader 22 through the water makes the propeller or screw blade 34 rotate the assembled lure 10 to spin in a tight spin and provide flashes of brillance due to the pitch of the blade 34, in substantially the same tight spin of a crippled or dying bait fish that has been injured by a game fish, thus causing the game fish to readily take the lure and be caught on the hook 40. The blade 34 is pitched so as to bore through the water, giving the bait 14 the desired movement.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A spinning fish bait lure comprising a U-shaped muzzle encompassing both lips of the mouth of a fish bait, a narrow shaft extending through one eye of the fish bait into the body thereof, said shaft extending integrally from the end of one U-leg of said muzzle, and a spinner blade extending integrally from one side edge of one U-leg of said muzzle.

2. The lure of claim 1, said spinner blade extending smoothly outwardly away from its U-leg, the edge of said spinner blade furthermost from the bight of the U of the muzzle extending smoothly downwardly therefrom.

3. A spinning fish bait lure harness comprising a U-shaped muzzle adapted to be placed over the mouth of a fish bait, a narrow shaft adapted to be inserted through one eye of the fish bait into the body thereof, said shaft extending integrally from one U-leg of said muzzle, and a spinner blade extending integrally from one edge of one U-leg of said muzzle, said spinner blade extending smoothly outwardly away from its U-leg, the edge of said spinner blade furthermost from the bight of the U of the muzzle extending smoothly downwardly therefrom, said muzzle having an aperture approximately centrally of the bight of the U, in combination with a fish hook leader extending through said aperture, a fish hook at one end of said leader adapted to be inserted in the tail of the fish bait, a bead slidably secured on said leader between said muzzle and the fish hook end and adapted to be wedged between one muzzle side and the other eye of the fish bait, the other end of the leader being securable to a fishing line.

4. A spinning fish bait lure harness comprising a U-shaped muzzle adapted to be placed over the mouth of a fish bait, a narrow shaft adapted to be inserted through one eye of the fish bait into the body thereof, said shaft extending integrally from one U-leg of said muzzle, and a spinner blade extending integrally from one side edge of said same one U-leg of said muzzle, said spinner blade extending smoothly outwardly away from its U-leg, the edge of said spinner blade furthermost from the bight of the U of the muzzle extending smoothly downwardly therefrom, said muzzle having an aperture approximately centrally of the bight of the U, in combination with a fish hook leader extending through said aperture, a triple fish hook at one end of said leader adapted to have one hook thereof inserted in the tail of the fish bait, a bead slidably secured on said leader between said muzzle and the fish hook end and adapted to be wedged between one muzzle side and the other eye of the fish bait, the other end of the leader being securable to a fishing line.

5. The combination of claim 4, said harness being made of transparent material.

References Cited by the Examiner

UNITED STATES PATENTS 2,916,846  12/59  Smith _____ 43—44.4

FOREIGN PATENTS 260,496  7/49  Switzerland.

SAMUEL KOREN, *Primary Examiner.*